United States Patent [19]

Watanabe et al.

[11] Patent Number: 4,984,238
[45] Date of Patent: Jan. 8, 1991

[54] METHOD AND APPARATUS FOR FRAME SYNCHRONIZATION

[75] Inventors: Toshiaki Watanabe, Kawasaki; Kazuo Iguchi, Yokohama; Tetsuo Soejima, Tama, all of Japan

[73] Assignee: Fujitsu Limited, Kawasaki, Japan

[21] Appl. No.: 320,588

[22] Filed: Mar. 8, 1989

[30] Foreign Application Priority Data

Mar. 14, 1988 [JP]  Japan ................. 63-060143

[51] Int. Cl.⁵ .............................................. H04J 3/06
[52] U.S. Cl. ............................. 370/105.1; 370/105.4; 370/106; 375/114; 375/116
[58] Field of Search ............... 370/100.1, 105.1, 105.4, 370/106; 375/31, 32, 106, 114, 116

[56] References Cited

U.S. PATENT DOCUMENTS

| | | | |
|---|---|---|---|
| 4,276,642 | 6/1981 | Siglow et al. | 370/105.1 |
| 4,543,652 | 9/1985 | Amada et al. | 370/105.1 |
| 4,698,806 | 10/1987 | Graves et al. | 370/105.1 |
| 4,744,081 | 5/1988 | Buckland | 370/105.1 |
| 4,748,623 | 5/1988 | Fujimoto | 370/105.1 |
| 4,788,681 | 11/1988 | Thomas et al. | 370/105.1 |

*Primary Examiner*—Douglas W. Olms
*Assistant Examiner*—Willington Chin
*Attorney, Agent, or Firm*—Staas & Halsey

[57] ABSTRACT

A frame synchronization method in which a synchronization detection of a frame synchronization signal using one of n-multiplexed frame synchronization signals derived from a sequence of frame synchronization signals each delayed by one bit from the preceding frame synchronization signal, a synchronization confirmation as synchronization guard by detecting a repetition of the synchronization detections of the frame synchronization signal, a confirmation of the subsequent frame identification signal based on the synchronization confirmation; and a separation of the received multiplexed signals into a plurality of channels based on the synchronization confirmed frame synchronization signal and the confirmed frame identification signal are carried out.

15 Claims, 9 Drawing Sheets

Fig. 1
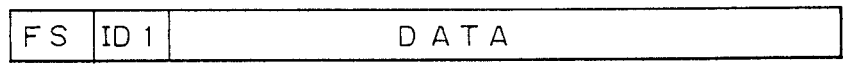
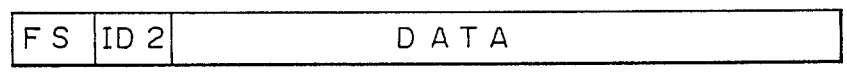
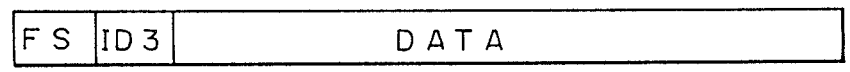
·
·
·
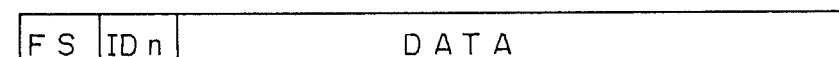
FS: FRAME SYNCHRONIZATION
ID1∼IDn: FRAME IDENTIFICATION

Fig. 3

BEFORE MULTIPLEXING

CHANNEL NO.1 | FS | ID1 | DATA | FS | ID1 | DATA |

CHANNEL NO.2 | FS | ID2 | DATA | FS | ID2 | DATA |

⋮

CHANNEL NO.n | FS | IDn | DATA | FS | IDn | DATA |

AFTER MULTIPLEXING

TRANSMISSION LINE | FS | FS | ... | FS | ID1 | ID2 | ... | IDn | DATA |

Fig. 7
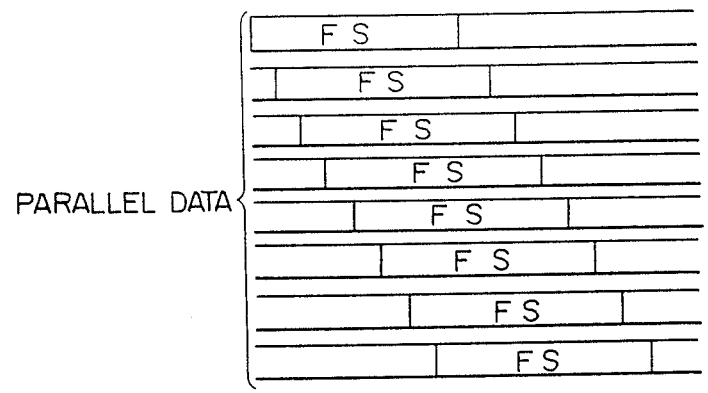
SERIAL DATA
PARALLEL DATA
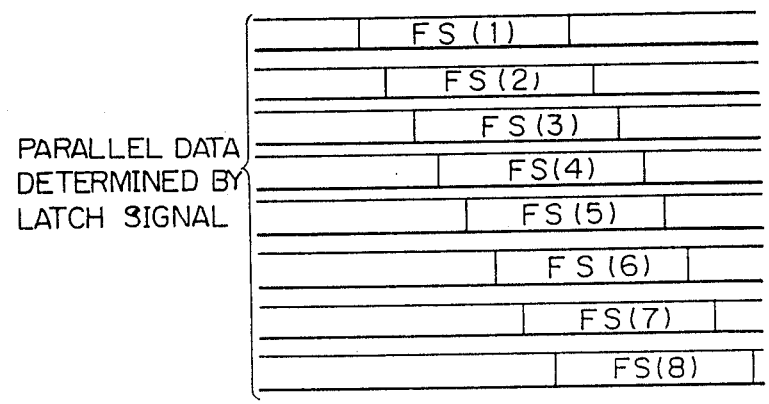
LATCH SIGNAL
PARALLEL DATA DETERMINED BY LATCH SIGNAL

METHOD AND APPARATUS FOR FRAME SYNCHRONIZATION

BACKGROUND OF THE INVENTION

1. Field of the Invention

The present invention is related to a method and apparatus for frame synchronization in data transmission. The method and apparatus according to the present invention are used for a high speed transmission of PCM signals in a data communication network.

2. Description of the Related Arts

In the prior art frame synchronization method, the detection of frame synchronization is carried out by successively shifting the frame synchronization pattern by one clock cycle. Accordingly, for example, the detection and identification of the frame synchronization pattern should be carried out, in the case where three groups of data of 50 Mbps are 3-multiplexed to form data of 150 Mbps, within one clock period of 150 Mbps. In such a short period, i.e., at such a high speed, it is difficult to carry out frame synchronization pattern detection reliably.

In order to reduce the speed requirement of the operation, another method has been proposed in which a latch portion, parallel synchronization detection portion, and data separation portion are provided. In this method, since the data is converted into eight groups of parallel data, latched every 8 bits, and detection of frame synchronization pattern is carried out per latch period, the speed requirement of the operation is reduced by one-eighth in comparison with the above-described prior art method.

However, since the number of frame synchronization pattern detection portions is required to correspond to the number of frame synchronization patterns for multiplexing, the scale and complexity of the circuits of the apparatus tends to be increased. Such an increase of the scale and complexity of the circuits of the apparatus is disadvantageous.

SUMMARY OF THE INVENTION

It is an object of the present invention to provide an improved method and apparatus for carrying out frame synchronization in which the detection of a frame synchronization signal at a low speed is enabled without increasing the scale and complexity of the circuits of the apparatus.

In accordance with the present invention there is provided a frame synchronization method including the steps of:

receiving serial signals including a frame synchronization signals and frame identification signals transmitted serially through a transmission line in n-multiplexed form;

latching parallel signals converted from the received serial signals;

carrying out synchronization detection of a frame synchronization signal using one of n-multiplexed frame synchronization signals derived from a sequence of frame synchronization signals each delayed by one bit from the preceding frame synchronization signal;

carrying out synchronization confirmation as a guard of synchronization by detecting a repetition of the synchronization detections of the frame synchronization signal;

confirming the subsequent frame identification signal based on the synchronization confirmation; and carrying out separation of the received multiplexed signals into a plurality of channels based on the synchronization confirmed frame synchronization signal and the confirmed frame identification signal.

BRIEF DESCRIPTION OF THE DRAWINGS

FIG. 1 shows a pattern of data received in the form of a frame in a multiplexed signal transmission system;

FIG. 3 shows the patterns of a transmission signal before and after multiplexing;

FIG. 7 illustrates the operation of the apparatus of FIG. 6;

DESCRIPTION OF THE PREFERRED EMBODIMENTS

Figure 2:
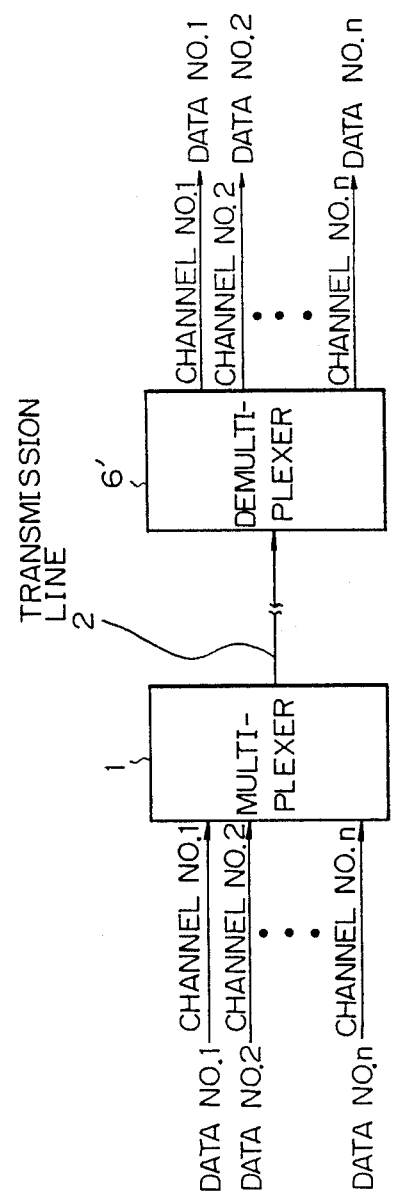
FIG. 2 shows a fundamental constitution of a multiplexed signal transmission system.
Figure 4:
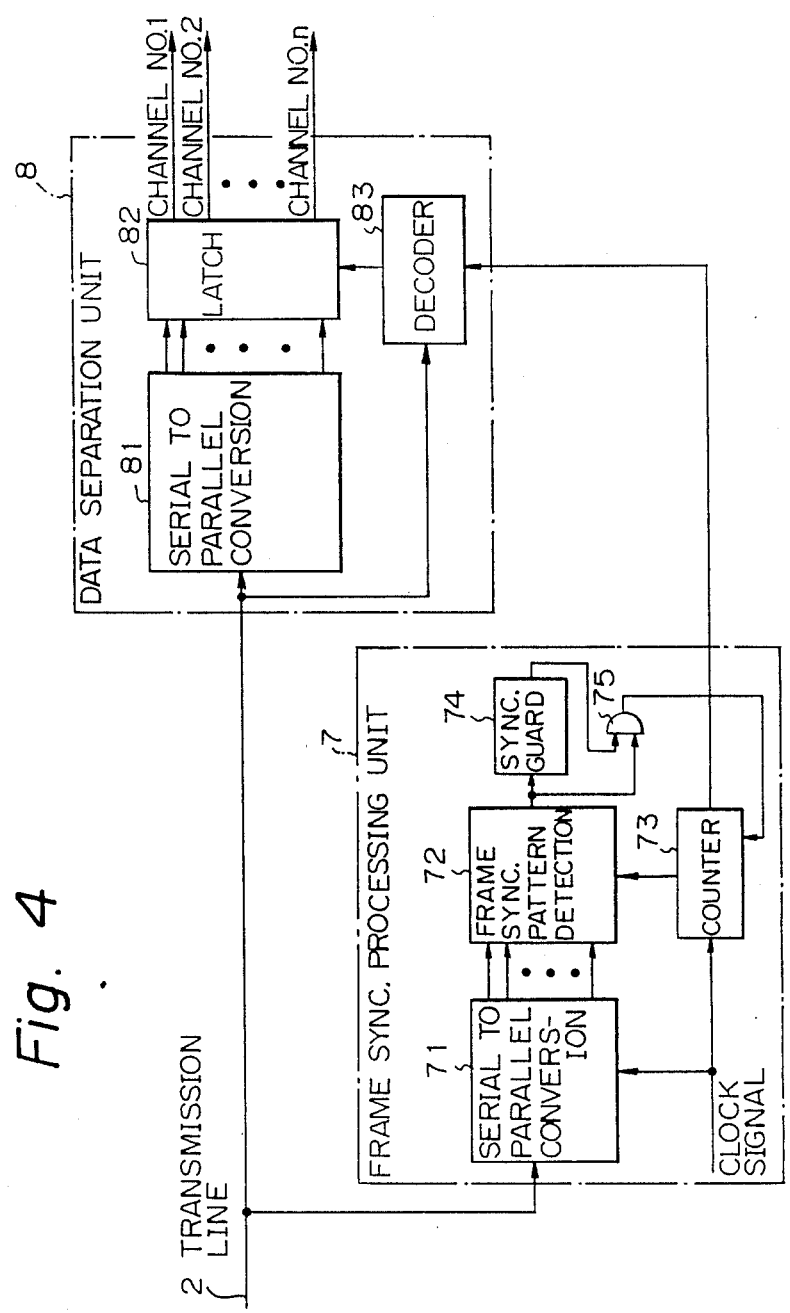
FIG. 4 shows a prior art apparatus for carrying out frame synchronization.

Before describing a preferred embodiment of the present invention, the general pattern of signals received in a multiplexed signal transmission system will be explained with reference to FIGS. 1, 2, and 3, and a prior art apparatus for carrying out frame synchronization in a multiplexed signal transmission system will be explained with reference to FIG. 4. The operation of the prior art apparatus of FIG. 4 will be explained with reference to FIG. 5.

In a high speed transmission network, used for, for example, PCM communication, a plurality of information in the form of frames as shown in FIG. 1 are to be transmitted. Each of the frames of information comprises a frame synchronization signal FS, a frame identification signal ID, and data. Data No. 1, No. 2, ... No. n through channel No. 1, No. 2... No. n are multiplexed in the multiplexer 1 on the sender side (FIG. 2) and the multiplexed data is transmitted through the transmission line 2 to the demultiplexer 6' on the receiver side. In the demultiplexer 6', the received multiplexed data is demultiplexed to be separated into data No. 1, No. 2, ... No. n for the channel Nos. 1 to n. For identification of each of the data No. 1, No. 2, ... No. n, a byte frame synchronization signal FS, and a frame identification signal ID are placed at the beginning of each of the data No. 1, No. 2, ... No. n. In the prior art apparatus of FIG. 4, there are provided a frame synchronization processing unit 7 including a serial to parallel conversion portion 71, a frame synchronization pattern detection portion 72, a counter 73, a synchronization guard portion 74, and an AND gate; and a data separation unit 8 including a serial to parallel conversion unit 81, a latch 82, and a decoder 83.

Figure 5:
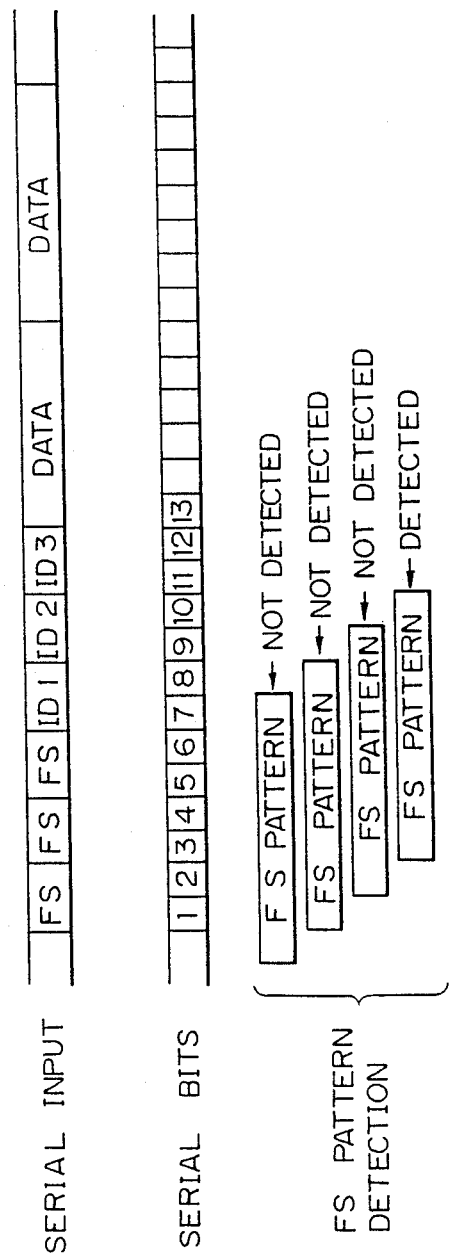
FIG. 5 illustrates the operation of the prior art apparatus of FIG. 4.

As shown in FIG. 5, the received serial data is converted into parallel data in the serial to parallel conversion portion 71, and the converted parallel data is supplied to the frame synchronization pattern detection portion 72. In the frame synchronization pattern detection portion 72 a shifting operation is carried out successively by one clock cycle. Due to this shifting operation, a coincidence of frame synchronization must occur at one phase of the shifting, so that the detection of frame synchronization can be carried out.

When frame synchronization is detected, a coincidence pulse is supplied from the frame synchronization pattern detection portion 72 to the synchronization guard portion 74 for ensuring the reliability of detection of synchronization. After detecting a predetermined number of coincidence pulses, the synchronization guard portion 74 delivers an output signal to the AND gate 75. Receiving the output signal of the synchronization guard portion 74 and the coincidence pulse from the frame synchronization pattern detection portion, the AND gate 75 delivers a reset signal to the counter 73. The counter 73 is operated with this reset signal as timing of the beginning of the frame synchronization. The information of the beginning of the frame synchronization is supplied from the counter 73 to the decoder 83 of the data separation unit 8. In the decoder 83, latch timing of the latch 82 is determined based on the information of the beginning of the frame synchronization and the frame identification signal from the transmission line 2. Thus, in the latch 82, the separation of the received data into channel No. 1, No. 2, . . . No. n is carried out.

Figure 6:
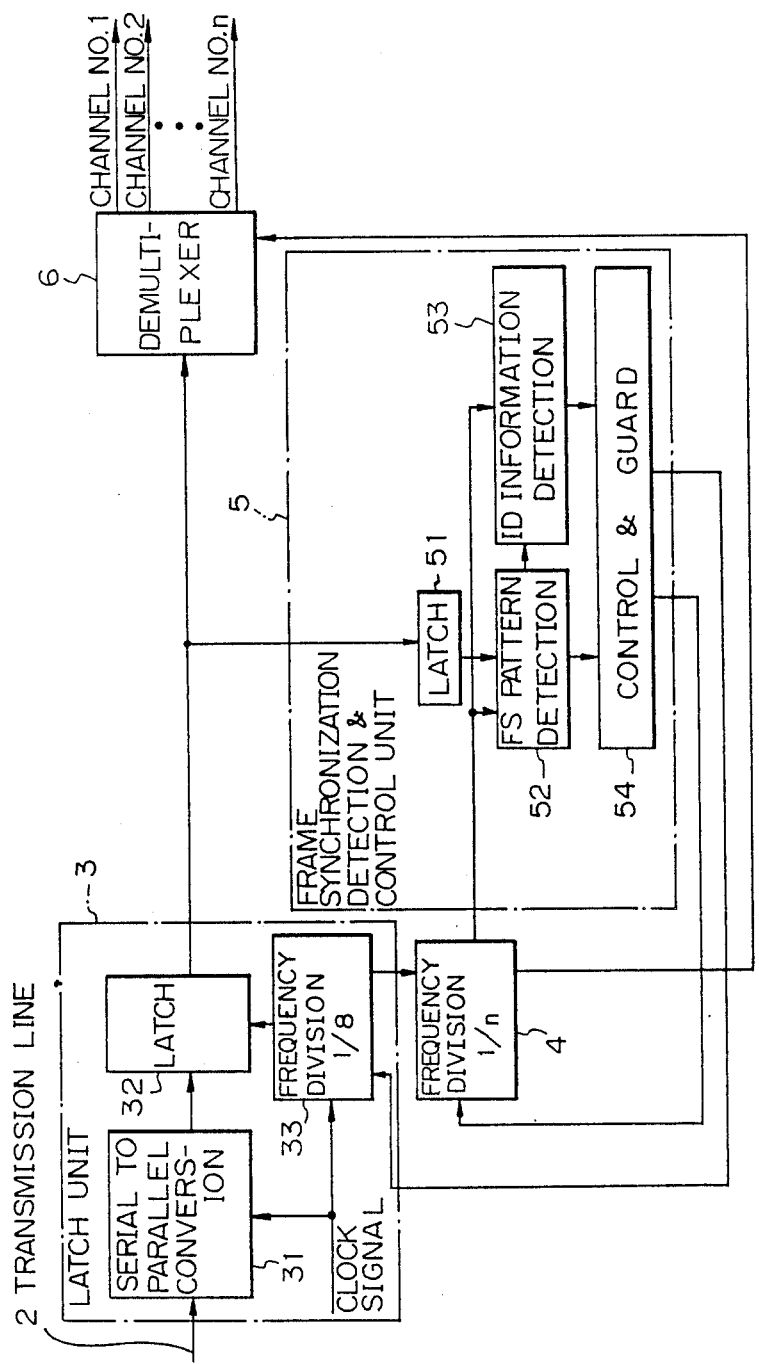
FIG. 6 shows an apparatus for carrying out frame synchronization according to an embodiment of the present invention.

An apparatus for carrying out frame synchronization according to an embodiment of the present invention is shown in FIG. 6. The apparatus of FIG. 6 includes a latch unit 3 having a serial to parallel conversion portion 31, a latch 32, and a ⅛ frequency divider portion 33, a frequency division-by-n portion 4, a synchronization detection & control unit 5 having a latch 51, a frame synchronization pattern detection portion 52, a frame identification information detection portion 53, and a control and guard portion 54, and a demultiplexer 6.

In the serial to parallel conversion portion 31, serially transmitted 3-multiplex signals are converted into parallel signals, as illustrated in FIG. 7, where the multiplex number n is assumed to be 3. In the latch 32, data are latched in units of 8 bits per ⅛ frequency division of the clock signal from the ⅛ frequency division portion 33.

Figure 8:
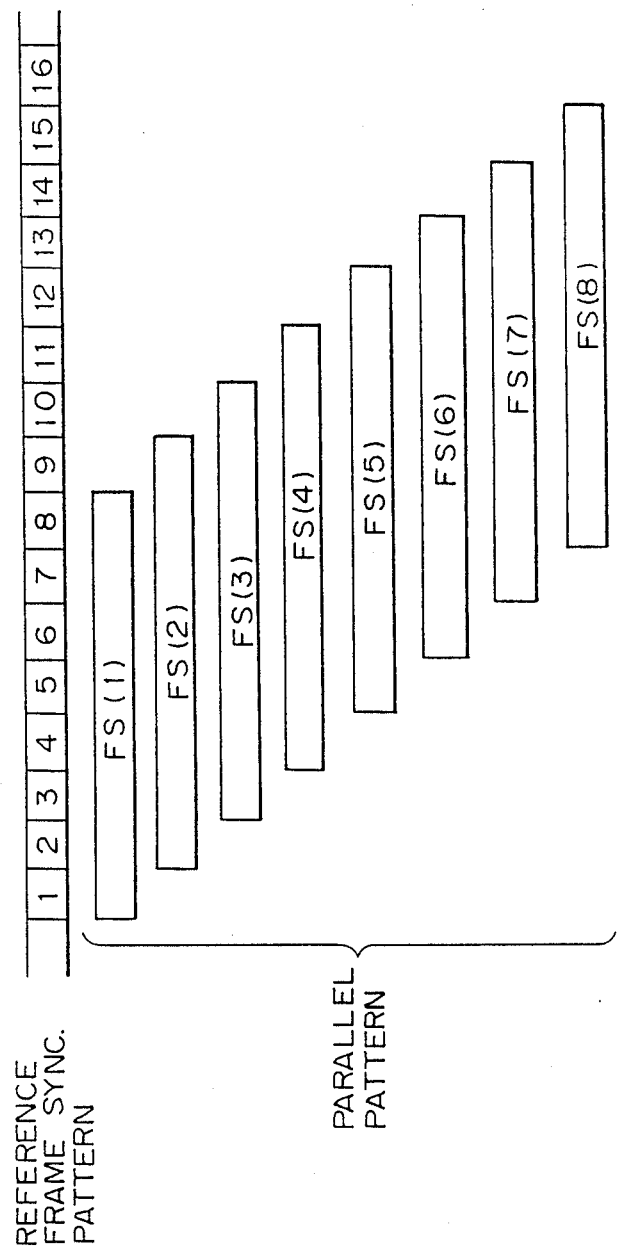
FIG. 8 illustrates the operation of synchronization detection in the apparatus of FIG. 6.

In the latch 51, the converted parallel data from the latch 32 is further latched to produce parallel data. Latch 51 provides the frame synchronization pattern detection portion 52, with a sequence of signals each shifted by one bit from the preceding signal. This sequence of signals is illustrated in FIG. 8. In the frame synchronization pattern detection portion 52, one of the FS patterns, as a frame synchronization signal is detected from the sequence of signals supplied from latch 51.

The first FS pattern corresponds to bit 1 to bit 8; the second, bit 2 to bit 9; the third, bit 3 to bit 10; and so on, to the eighth, bit 8 to bit 15.

Figure 9:
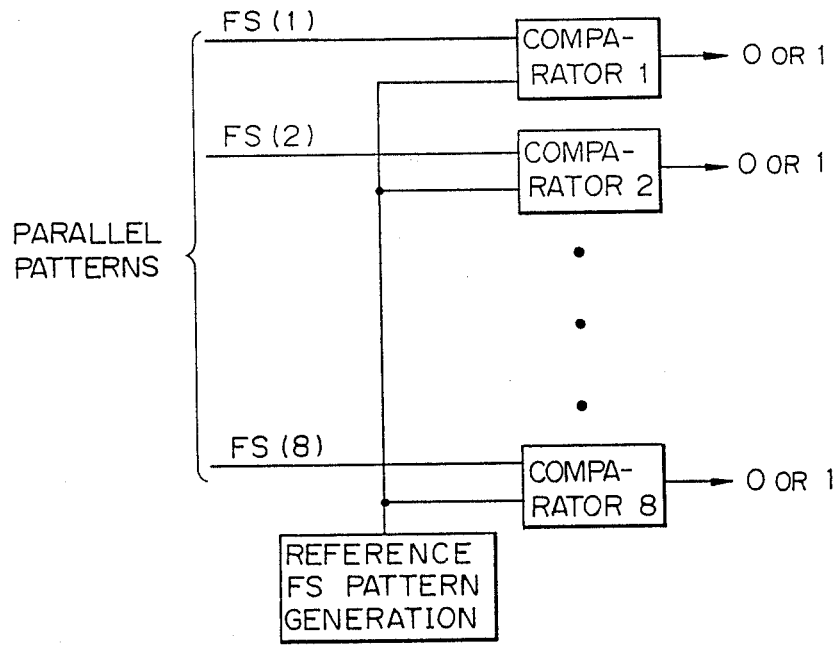
FIG. 9 shows a device for carrying out the synchronization detection in the apparatus of FIG. 6.

The function of the frame synchronization pattern detection portion 52 is illustrated in FIG. 9. In the sequence of comparator Nos. 1 to 8, the sequence of frame synchronization patterns FS-1 to FS-8 is compared with the reference frame synchronization pattern supplied from a reference FS pattern generation member which generates a reference FS pattern comprising a sequence of bit 1, bit 2, bit 3, . . . as shown in FIG. 8. Each of the comparators produces a "0" output when two inputs do not coincide, but produces a "1" output only when two inputs coincide. Therefore, in the sequence of the comparator Nos. 1 to 8, only one comparator which receives the same frame synchronization pattern as the reference FS pattern produces a "1" output, and this "1" output indicates the detection of the frame synchronization pattern in question.

Figure 10:
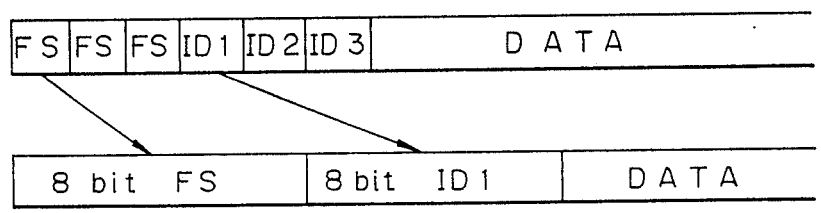
FIG. 10 illustrates the detection of the frame identification information.

In the frame identification information detection portion 53, the detection of frame identification information is carried out based on the detected frame synchronization pattern from the FS pattern detection portion 52. If the detected frame synchronization is the first FS, the 8 bit frame identification signal ID1 follows the detected 8 bit FS signal as shown in FIG. 10.

In the control and guard portion 54, synchronization confirmation is carried out as a guard of synchronization. This synchronization confirmation is performed by detecting a repetition of the synchronization detections of the frame synchronization signal, based on the FS pattern detection signal from the FS pattern detection portion 52 and the frame identification information detection portion 53.

After that, in the control and guard portion 54, a shift signal is produced based on the detection in the FS pattern detection portion 52 and the produced signal is supplied to the frequency division portion 33 of the latch unit 3 to regulate the timing of frequency division.

Also, the control signal from the control and guard portion 54 which is the information indicating the beginning of frame synchronization in the channel in question is supplied to the 1/n frequency division portion 4.

In the 1/n frequency division portion 4, the ⅛ frequency divided clock signal is further frequency divided by n. The produced frequency divided clock signal from the 1/n frequency division portion 4 is supplied as a detection timing control signal to the FS pattern detection portion 52 and the frame identification information detection portion 53. Also, the frequency divided clock signal produced from the 1/n frequency division portion 4 is supplied to the demultiplexer 6. Based on this frequency divided clock signal from the 1/n frequency division portion 4, the beginning position of selection in the demultiplexer 6 is determined, and the received data is separated into predetermined channels No. 1 to No. n in the demultiplexer 6 based on this determination.

As described above, in the apparatus of FIG. 6, the received serial data is converted into parallel data, and latched in groups of 8 bits to form parallel 8 bit data. The detection of an 8 bit frame synchronization pattern by comparison with the reference frame synchronization pattern is carried out at a 1/n frequency divided timing. A detection of frame synchronization is required with regard to only one frame synchronization pattern.

For example, even in the case where three groups of data of 50 Mbps are 3-multiplexed to form data of 150 Mbps, the detection and identification of the frame synchronization pattern must be carried out within one clock period of only 50 Mbps. Thus it is possible to detect the frame synchronization at a low speed which cannot be attained by the prior art. This advantage of the apparatus of the present invention is attained regardless of the multiplex number n. Accordingly, an increase in scale and complexity of the circuits involved in the apparatus is prevented according to the apparatus of the present invention, even if the multiplex number n is increased. Therefore, a practical and advantageous method and apparatus can be provided according to the present invention.

We claim:

1. A frame synchronization method comprising the steps of:
    (a) receiving serial signals including frame synchronization signals and frame identification signals transmitted serially through a transmission line in n-multiplexed form;
    (b) converting said received serial signals to parallel signals;
    (c) latching said parallel signals;
    (d) carrying out synchronization detection of a frame synchronization signal using one of n-multiplexed frame synchronization signals derived from a sequence of frame synchronization signals each delayed by one bit from the preceding frame synchronization signal;
    (e) carrying out synchronization confirmation as a guard of synchronization by detecting a repetition of said synchronization detections of said frame synchronization signal;
    (f) confirming the subsequent frame identification signal based on said synchronization confirmation; and
    (g) carrying out separation of said received multiplexed signals into a plurality of channels based on said synchronization confirmed frame synchronization signal and said confirmed frame identification signal.

2. A frame synchronization apparatus for processing serially n-multiplexed signals received from a transmission line and including frame synchronization signals, frame identification signals and data signals, comprising:
    latch means, operatively connected to the transmission line and including a serial to parallel conversion means, a first latch means, and a first frequency division means, for latching parallel signals converted from the serially n-multiplexed signals;
    second frequency division means for carrying out 1/n frequency division to produce a control signal;
    frame synchronization detection and control means operatively connected to said latch means, including a second latch means, a frame pattern detection means, a frame identification detection means, and a control and guard means, for detecting synchronization of the frame synchronization signals using one of n-multiplexed frame synchronization signals derived from a sequence of frame synchronization signals each delayed by one bit from the preceding frame synchronization signal, for confirming the subsequent frame identification signal, for confirming synchronization as a guard of synchronization detection, and for generating a second control signal for said first and second frequency division means; and
    demultiplexer means, responsive to the output of said first latch means and said control signal from said second frequency division means, for separating the n-multiplexed signals into a plurality of channels.

3. A frame synchronization apparatus for processing serially n-multiplexed signals received from a transmission line and including frame synchronization signals, frame identification signals and data signals, comprising:
    latch means, operatively connected to the transmission line, for providing a sequence of delayed frame synchronization signals;
    frequency division means for providing a first control signal based upon a second control signal and 1/n frequency division of a clock signal;
    frame synchronization detection and control means, operatively connected to said latch means, for detecting synchronization of the frame synchronization signals using at least one of the delayed frame synchronization signals, and for generating said second control signal based on said detection of synchronization of the frame synchronization signal;
    demultiplexer means for separating the n-multiplexed signals into a plurality of signals in response to said first control signal.

4. An apparatus as recited in claim 3, wherein said frame detection and control means includes:
    confirming means for confirming synchronization of the frame synchronization signals based on a least one of the frame identification signals.

5. An apparatus as recited in claim 4, wherein said frame detection and control means includes:
    guarding means for guarding synchronization of the frame synchronization signals based on reception of a frame synchronization signal that matches said at least one of the delayed frame synchronization signals and reception of a frame identification signal that matches said at least one of the frame identification signals.

6. An apparatus as recited in claim 3, said latch means includes:
    means for delaying each frame synchronization signal by one bit from the preceding frame synchronization signal.

7. An apparatus as recited in claim 3, wherein: said frequency division means includes means for providing a detection timing control signal based on said second control signal and 1/n frequency division of said clock signal; and
    said frame synchronization detection and control means includes means for detecting synchronization of the frame synchronization signals based on said detection timing control signal and said at lease one of the delayed frame synchronization signals.

8. An apparatus as recited in claim 3, wherein said frame synchronization detection and control means includes:
    means for comparing said sequence of delayed frame synchronization signals with a reference frame synchronization pattern.

9. An apparatus as recited in claim 3, wherein said frame synchronization detection and control means includes:
    means for providing a third control signal based on said detection of synchronization of the frame synchronization signals; and wherein said latch means includes:
    conversion means, operatively connected to the transmission line, for converting the n-multiplexed signals to parallel signals;
    second frequency division means for providing a frequency divided signal based on upon said third control signal and frequency division of a clock signal; and second latch means, operatively connected to said conversion means, for latching said parallel signals in response to said frequency divided signal.

10. An apparatus as recited in claim 9, wherein said demultiplexer means includes means for receiving said n-multiplexed signals from said second latch means.

11. A method as recited in claim 1, wherein step (d) includes comparing said sequence of frame synchronization signals with a reference frame synchronization pattern.

12. A method as recited in claim 1, wherein the received n-multiplexed signals further include data signals.

13. A frame synchronization apparatus for processing serially n-multiplexed signals received from a transmission line and including frame synchronization signals, frame identification signals and data signals, comprising:

latch means, operatively connected to the transmission line, for providing a sequence of delayed frame synchronization signals;

frequency division means for providing a first control signal and a detection timing control signal based upon a second control signal and 1/n frequency division of a clock signal frame synchronization detection and control means, operatively connected to said latch means, for detecting synchronization of the frame synchronization signals using at least one of the delayed frame synchronization signals, and for generating said second control signal based on said detection of synchronization of the frame synchronization signal, said frame synchronization detection and control means includes means for detecting synchronization of the frame synchronization signals based on said detection timing control signal and said at least one of the delayed frame synchronization signals; and demultiplexer means for separating the n-multiplexed signals into a plurality of signals in response to said first control signal.

14. A frame synchronization apparatus for processing serially n-multiplexed signals received from a transmission line and including frame synchronization signals, frame identification signals and data signals, comprising:

latch means, operatively connected to the transmissions lien, for providing a sequence of delayed frame synchronization signals;

frequency division means for providing a first control signal based upon a second control signal and 1/n frequency division of a clock signal;

frame synchronization detection and control means, operatively connected to said latch means, for detecting synchronization of the frame synchronization signals using at least one of the delayed frame synchronization signals, and for generating said second control signal based on said detection of synchronization of the frame synchronization signal, said frame synchronization detection and control means includes means for providing a third control signal based on said detection of synchronization of the frame synchronization signals;

demultiplexer means for separating the n-multiplexed signals into a plurality of signals in response to said first control signal; and said latch means includes conversion means, operatively connected to the transmission line, for converting the n-multiplexed signals to parallel signals; second frequency division means for providing a frequency divided signal based on said third control signal and frequency division of a clock signal; and second latch means operatively connected to said conversion means, for latching said parallel signals in response to said frequency divided signal.

15. An apparatus as recited in claim 14, wherein said demultiplexer means includes means for receiving said n-multiplexed signals from said second latch means.

* * * * *